United States Patent [19]

Schröder

[11] 4,297,036
[45] Oct. 27, 1981

[54] EXTRUDER FOR PREPLASTICIZATION OF THERMOSET MOLDING MATERIALS

[75] Inventor: Klaus Schröder, Marienheide, Fed. Rep. of Germany

[73] Assignee: Firma C. & W. Berges Maschinenfabrik, Marienheide, Fed. Rep. of Germany

[21] Appl. No.: 47,787

[22] Filed: Jun. 11, 1979

[30] Foreign Application Priority Data

Jun. 9, 1978 [DE] Fed. Rep. of Germany ....... 2825349

[51] Int. Cl.³ .......................... B29B 1/06; B29B 5/04
[52] U.S. Cl. ..................... 366/77; 366/79; 366/189; 366/194; 425/558
[58] Field of Search ............... 366/77, 79–90, 366/189, 194, 318–324; 425/208, 557, 558; 100/147, 251; 264/323, 328.19, 539; 141/284; 222/255, 260, 261, 354, 363

[56] References Cited

U.S. PATENT DOCUMENTS

| | | | |
|---|---|---|---|
| 3,253,303 | 5/1966 | Bradt | 425/557 X |
| 3,342,913 | 9/1967 | Engel | 264/523 X |
| 4,124,308 | 11/1978 | Sokolow | 366/77 |
| 4,134,687 | 1/1979 | Eckardt | 366/77 X |
| 4,146,067 | 3/1979 | Ziegler | 141/284 X |

FOREIGN PATENT DOCUMENTS

| | | | |
|---|---|---|---|
| 103491 | 1/1966 | Denmark | 425/208 |
| 41-7188 | 9/1966 | Japan | 425/557 |
| 46-25426 | 6/1971 | Japan | 425/557 |

Primary Examiner—Philip R. Coe
Attorney, Agent, or Firm—Webb, Burden, Robinson & Webb

[57] ABSTRACT

An extruder for the preplasticization of thermoset molding resins is disclosed. The extrusion machine includes a screw that rotates in a heated cylinder and compresses the fed-in pulverulent thermoset resinous material against a predetermined ramming pressure until it is plasticized. At the discharge end of the screw cylinder a receiving cylinder is disposed which has a hydraulic discharge piston which continuously retracts when an adjustable pressure head has been exceeded.

1 Claim, 3 Drawing Figures

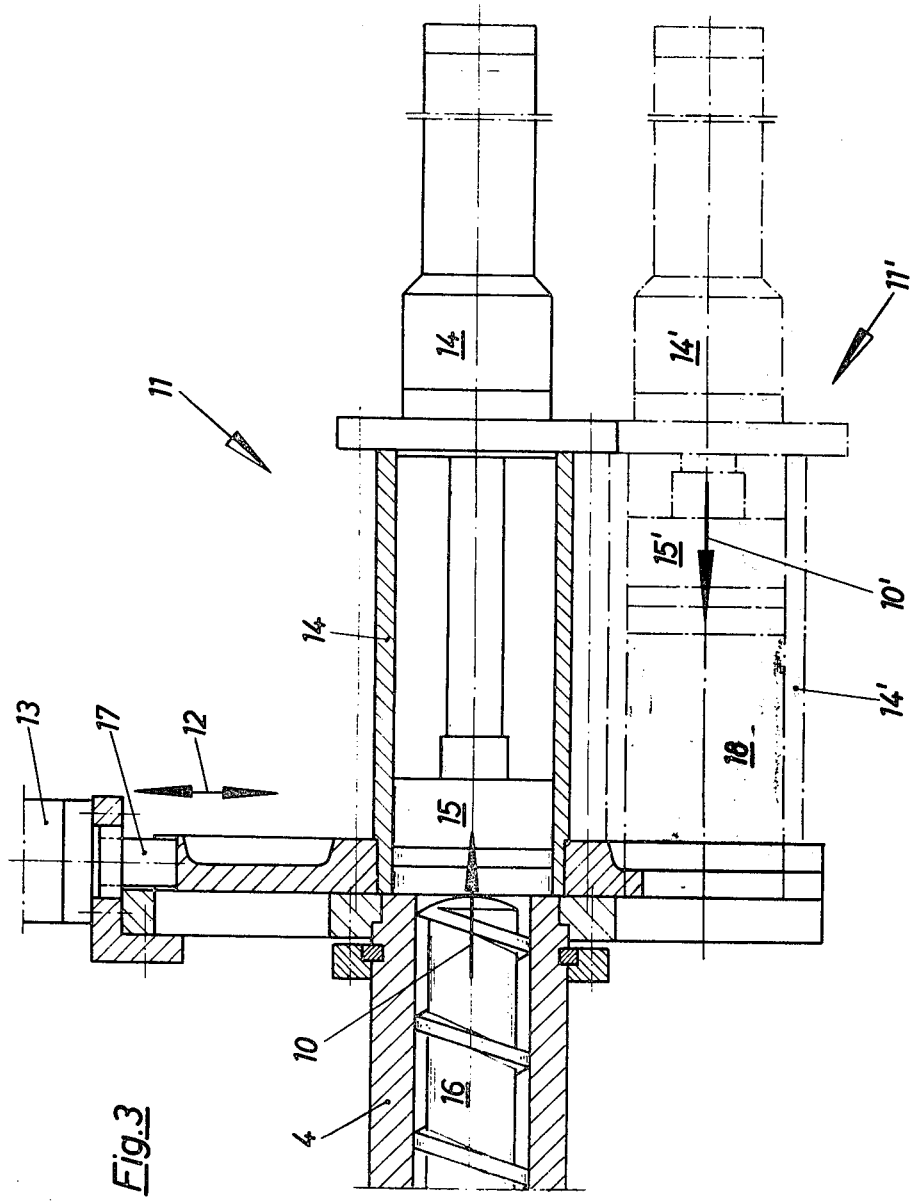

EXTRUDER FOR PREPLASTICIZATION OF THERMOSET MOLDING MATERIALS

BACKGROUND OF THE INVENTION

This invention relates to a screw extruder for the preplasticization of thermoset molding materials and more particularly to a screw extruder which plasticizes pulverulent material against a ramming pressure.

DESCRIPTION OF THE PRIOR ART

It has been proposed when manufacturing articles from the thermoset materials to begin the molding process with other than pulverulent molding materials. The molding materials are pretreated by preplasticization by special operations in appropriate apparatus (see German Gebrauchsmuster 1,950,805). The preplasticization allows a substantial shortening in the hardening times and also shortens processing times, particularly with respect to large and thick walled molded parts. The preplasticization results in a substantial increase in the capacity of the particular molding machine, permits maximum utilization of a particular machine's molding capacity, permits multiple dosing, leads to extended tool life and makes maximum compaction of the thermoset material possible, and hence, a more homogeneous molded article.

Machines that are used for the preplasticization of thermoset operate according to the principles of screw injection molding machines. The pulverulent molding material is drawn in by a screw rotating in a heated cylinder and is conveyed to the closed end of the screw. In doing so the screw is displaced backwardly against an adjustable pressure head. Due to the heat transfer from the heated cylinder and the heat of friction imparted by the rotation of the screw, the kinetic energy is transferred to the material and thus plasticizes it. Dosing of the thermoset material is effected by limiting the backward movement of the screw. After the closure at the end of the screw is opened, the plasticized mass is ejected and placed into an open mold and is further processed.

Such preplasticizing machines have the disadvantage that in discontinuous operation they deliver only relatively small portions of preplasticized material. Increasing the dosage of the preplasticized mass causes problems which defeat the purpose of the preplasticization. If the diameter of the screw is increased the external heating is inadequate for uniform heating of the thermoset material. Any elongation of the screw extruder results merely in the preplasticized mass and molding screw absorbing different amounts of heat as the result of different retention times and thus has deleterious effects on the uniformity of the degree of preplasticization.

In accordance with the present invention a preplasticization screw extrusion machine is provided which overcomes the problems of screw extruders which operate discontinuously and gains the advantage of changing at random, the size of the discontinuously accumulating plasticized mass as well as the profile of the mass itself.

BRIEF DESCRIPTION OF THE INVENTION

A screw extruder for the preplasticization is provided by disposing a receiving cylinder at the discharge end of the screw cylinder with a hydraulic ejection piston which retracts continuously whenever an adjustable pressure head is exceeded. With the aid of a sliding pressure cylinder the ejecting piston may be moved together with the receiving cylinder at right angles to the direction of the longitudinal axis of the plasticizing screw.

BRIEF DESCRIPTION OF THE DRAWINGS

The following drawings will further illustrate the principles of the present invention.

FIG. 3 is a plan view of the supplementary member 11 shown in FIG. 1 and viewed in a partial section.

DETAILED DESCRIPTION OF THE DRAWINGS

Figure 1:
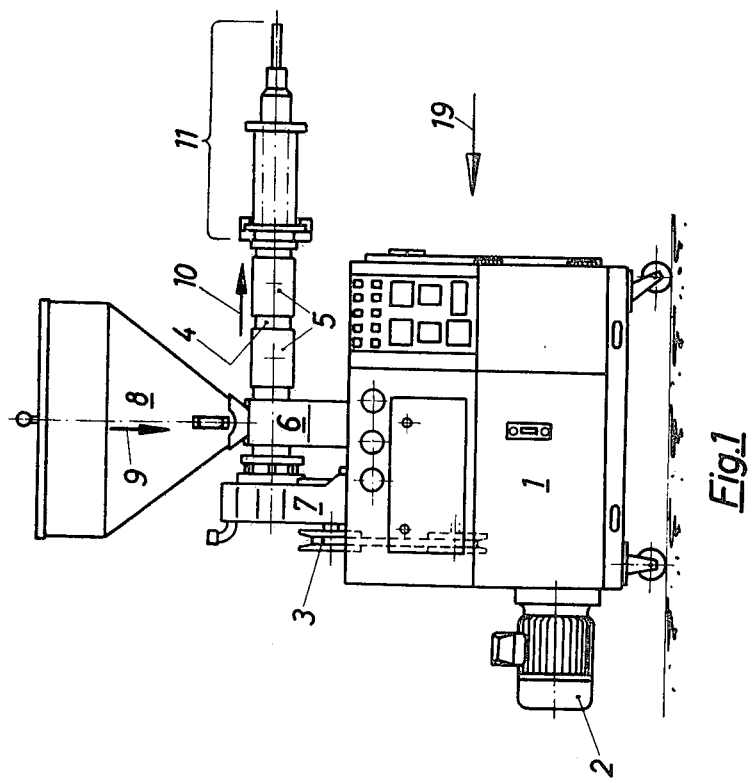
FIG. 1 is a side elevation of an extrusion machine for the preplasticization of thermoset materials.
Figure 2:
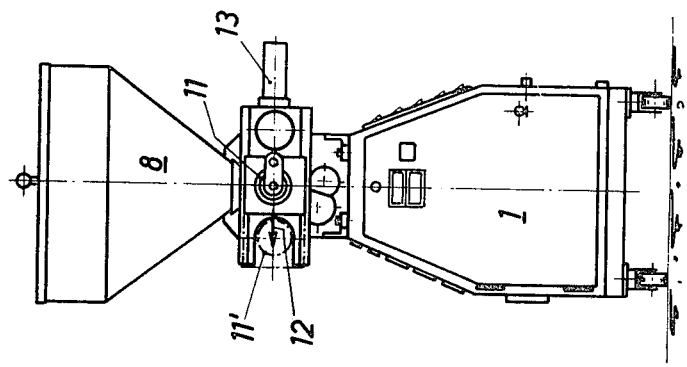
FIG. 2 is a front elevation of the machine shown in FIG. 1 in the direction of arrow 19.

The preplasticizing machine shown in FIGS. 1 through 3 comprises a switch cabinet 1, an electric driving motor 2, an infinitely variable transmission 3, and two support members 6 and 7 which hold screw cylinder 4 and material funnel 8.

The pulverulent organic thermoset material is drawn downwardly from the material funnel 8 in the direction of arrow 9 into the receiving end of horizontally disposed screw cylinder 4. During the course of plasticization effected by plasticizing screw 16, this pulverulent material is moved along in the direction of arrow 10 to the discharge end of screw cylinder 4. Screw cylinder 4 is equipped in a conventional manner with two external heaters 5.

In accordance with the present invention the apparatus 11 is placed at the terminus and adjacent to the screw cylinder 4. The apparatus 11 consists of a receiving cylinder 14 in which a hydraulic ejecting piston 15 is movable in the direction of arrows 10 and 10'. The hydraulic ejection piston 15 moves in the direction of the arrow 10 in the position drawn in solid lines while in the phantom portion of ejecting piston 15' the latter moves in the direction of arrow 10'.

The continuous retracting movement of the ejecting piston 15 in the direction of arrow 10 occurs as a result of hydraulic adjustment whenever a certain desired pressure head is achieved by rotating plasticizing screw 16. When ejection piston 15 has reached its most backward position or some other predetermined position, the interior chamber of receiving cylinder 14 which is located on the side of piston 15 driven from the piston rod side, is filled with preplasticized thermoset material. This preplasticized thermoset material 18 is then ejected from the apparatus in the view shown in phantom in the direction of arrow 10.

The lateral movement required in the direction of two-headed arrow 12 of receiving cylinder 14 inclusive of ejecting piston 15 is by a laterally disposed pushing cylinder 13 whose piston rod 17 effects this lateral displacement.

Thus, the apparatus in accordance with the invention provides the possibility of combining one in the same plasticizing screw with different receiving cylinders of different dimensions and different profiles, with the result that the machine may be adapted to changing requirements. A further advantage of the present invention is also achieved in that the cleaning of the screw is substantially facilitated by the laterally displaceable ramming head. Furthermore, total ejection of the preplasticized mass from the ramming head is achieved.

Although the invention has been described with particular features and details, it is only to be limited as is set forth in the accompanying claims.

I claim:

1. In an extrusion machine for the preplasticization of thermosetting plastics including a rotating screw and a heated screw cylinder which compresses pulverulent material against a pressure head to impart plasticization, the improvement comprising:
   (a) a receiving cylinder positioned adjacent the discharge end and coaxial with the screw cylinder, said receiving cylinder having a hydraulic discharge piston which continually retracts when an adjustable pressure head has been exceeded; and
   (b) a sliding pressure cylinder for moving said receiving cylinder at right angles to the direction of the longitudinal axis of said screw.

* * * * *